United States Patent [19]
Yao

[11] Patent Number: 5,561,726
[45] Date of Patent: Oct. 1, 1996

[54] APPARATUS AND METHOD FOR CONNECTING POLARIZATION SENSITIVE DEVICES

[76] Inventor: X. Steve Yao, 22520 Mountain Laurel Way, Diamond Bar, Calif. 91765

[21] Appl. No.: 523,723

[22] Filed: Sep. 5, 1995

[51] Int. Cl.$^6$ .............................. G02B 6/00; G02B 5/20; G01J 4/00
[52] U.S. Cl. ................. 385/11; 385/55; 385/70; 385/140; 359/483; 356/365; 356/370
[58] Field of Search .................................. 385/11, 15, 31, 385/27, 28, 55, 56, 70, 75, 140; 359/483, 484, 489, 494, 497, 501; 356/364, 365, 370, 351

[56] References Cited

U.S. PATENT DOCUMENTS

| | | | |
|---|---|---|---|
| 3,625,589 | 12/1971 | Snitzer | 385/11 X |
| 4,341,442 | 7/1982 | Johnson | 385/11 X |
| 4,389,090 | 6/1983 | LeFevre | 385/11 X |
| 4,753,507 | 6/1988 | DePaula et al. | 385/11 X |
| 4,787,694 | 11/1988 | Brambley et al. | 385/11 X |
| 4,793,678 | 12/1988 | Matsumoto et al. | 385/11 X |
| 4,898,441 | 2/1990 | Shimizu | 385/14 X |
| 4,960,319 | 10/1990 | Dankowych | 385/11 X |
| 4,966,431 | 10/1990 | Heismann | 385/14 X |
| 4,979,235 | 12/1990 | Rumbaugh et al. | 385/11 X |
| 4,988,169 | 1/1991 | Walker | 385/11 X |
| 5,004,312 | 4/1991 | Shimizu | 385/11 X |
| 5,212,743 | 5/1993 | Heismann | 385/11 |
| 5,285,507 | 2/1994 | Van der Tol | 385/11 |
| 5,473,457 | 12/1995 | Ono | 359/161 |

OTHER PUBLICATIONS

T. Okoshi, "Recent Advances in Coherent Optical Fiber Communication Systems," J. Lightwave Technology, vol. LT–5, No. 1, pp. 44–52, Jan. 1987.

T. Okoshi, "Polarization Control Schemes for Heterodyne and Homodyne Optical Fiber Communications," J. Lightwave Technology, vol. LT–3, No. 6, pp. 1232–1237, Dec. 1985.

I. P. Kaminov, "Polarization in Optical Fibers," IEEE J. Quantum Electronics, vol. QE–17, No. 1, pp. 15–22, Jan. 1981.

H. C. Lefevre, "Single–mode Fiber Fractional Wave Devices and Polarization Controllers," Electronics Letters, vol. 16, No. 20, pp. 778–780, Sep. 1980).

M. Johnson, "In–line fiber–optic polarization transformer," Applied Optics, vol. 18, No. 9, pp. 1288–1289, May 1979.

R. Noe, "Endless polarization control in coherent optical communications," Electronics Letters, vol. 22, No. 15, pp. 772–773, Jul. 1986.

H. Shimizu, S. Yamazaki, T. Ono, and K. Emura, "Highly practical fiber squeezer polarization controller," Journal of Lightwave Technology, vol. 9, No. 10, pp. 1217–1224, Oct. 1991.

(List continued on next page.)

Primary Examiner—Brian Healy

[57] ABSTRACT

A fiber optic apparatus for controlling the polarization state of light, for connecting polarization sensitive devices, and for providing a controlled variable attenuation in a fiber optic system. The center portion of a strand of optical fiber is placed in a rotatable fiber squeezer and is squeezed to produce a birefringent medium having a birefringent axis in the direction of squeezing pressure and the magnitude of the birefringence is controlled by the amount of pressure imposed by the fiber squeezer on the fiber center portion. Rotating the squeezer causes the birefringent axis to change and hence changes the polarization of light passing through the fiber strand. A desired polarization state is obtained by controlling the squeezing pressure and the rotation angle of the fiber squeezer. To use this apparatus to connect two polarization sensitive devices, simply place this apparatus between the two devices and adjust the pressure and orientation of the fiber squeezer until a desired polarization state for the receiving device is obtained. To use this apparatus to control the attenuation of light, simply connect a device having polarization dependent transmission to the output of this apparatus and adjust the pressure and orientation of the fiber squeezer until a desired attenuation is achieved.

22 Claims, 5 Drawing Sheets

OTHER PUBLICATIONS

R. Noe, H. Heidrich, and D. Hoffmann, "Endless Polarization Control Systems for Coherent Optics," Journal of Lightwave Technology, vol. 6, No. 7, pp. 1199–1207, Jul. 1988.

P. Granestrand and L. Thylen, "Active stabilization of polarization on a single–mode fiber," Electronics Letters, vol. 20, No. 9, pp. 365–366, Apr. 1984.

R. Alferness, "Electrooptic Guided–Wave Device for General Polarization Transformations," IEEE J. Quant. Electron., vol. QE–17, No. 6, pp. 965–969, 1981.

J. Noda, K. Kamoto, and Y. Sasaki, "Polarization Maintaining Fibers and their Applications," Journal of Lightwave Technology, vol. LT–4, No. 8, pp. 1071–1089, Aug. 1986.

M. Monerie, "Polarization–Maintaining Single–Mode Fiber Cables: Influence of Joints," Applied Optics, vol. 20, No. 14, pp. 2400–2406, Jul. 1981.

A. M. Smith, "Single–mode fiber pressure sensitivity," Electronics Letters, vol. 16, No. 20, pp. 773–774, Sep. 1980.

J. Sakai and T. Kimura, "Birefringence and Polarization Characteristics of Single–Mode Optical Fibers under Elastic Deformations," IEEE Journal of Quantum Electronics, vol. QE–17, No. 6, pp. 1041–1051, Jun. 1981.

R. Ulrich and A. Simon, "Polarization optics of twisted single–mode fibers," Applied Optics, vol. 18, No. 13, pp. 2241–2251, Jul. 1979.

A. Smith, "Birefringence induced by bends and twists in single–mode optical fiber," Applied Optics, vol. 19, No. 15, pp. 2060–2611, Aug. 1980.

M. Monerie and L. Jeunhomme, "Polarization mode coupling in long single–mode fibers," Optical and Quantum Electronics, vol. 12, pp. 449–461, Dec. 1980.

APPARATUS AND METHOD FOR CONNECTING POLARIZATION SENSITIVE DEVICES

BACKGROUND—FIELD OF THE INVENTION

This invention pertains generally to polarization control in fiber optic systems, specifically to a single-mode fiber optic apparatus for controlling the polarization state of light and for connecting polarization sensitive devices.

BACKGROUND—DESCRIPTION OF PRIOR ART

In present and future advanced fiber optic communication (T. Okoshi, "Recent Advances in Coherent Optical Fiber Communication Systems," J. Lightwave Technology, Vol. LT-5, No. 1, pp. 44–52, 1987) and sensing systems, many devices, such as interferometers and electro-optic modulators, are polarization sensitive. In order for these polarization sensitive devices to function properly, the polarization state of the input light must be precisely aligned with a particular axis of these devices. Unfortunately, the polarization state of light propagating in a length of standard circular fiber varies along the fiber due to the random birefringence induced by the thermal stress, mechanical stress, and irregularities of the fiber core (I. P. Kaminov, "Polarization in Optical Fibers," IEEE J. Quantum Electronics, Vol. QE-17, No. 1, pp. 15–22, 1981). Generally, at the output end of the fiber the light is elliptically polarized, with varying degrees of ellipticity, and with the major elliptical axis at an arbitrary angle relative to some reference orientation. To properly connect such a strand of standard fiber to a polarization sensitive device, one must first convert the arbitrarily polarized light from the standard fiber to a linearly polarized light and align it with the correct axis of the device.

Heretofore, there have been some attempts to accomplish such tasks. One method is to use the combination of a half wave plate and two quarter wave plates, as shown in FIG. 1. Because the wave plates only function properly with collimated light, the light from the fiber must first be collimated using a microlens. The collimated beam will then pass through the wave plates and then refocused using a second lens to couple the light to the fiber pigtail of the polarization sensitive device or directly to the device. The three wave plates are free to rotate independently to generate the desired linear polarization.

Unfortunately, such a device is inherently high cost and high loss. First, the collimation, alignment, and refocusing process is time consuming, resulting in high labor cost. Second, the wave plates are expensive, resulting high material cost. In addition, the wave plates and microlenses have to be anti reflection coated or angle polished to prevent back reflection, creating extra manufacturing cost. Finally, because the light has to be coupled out of the fiber and then refocused into the fiber, the insertion loss is high. Additionally, the wave plates are wavelength sensitive, making the device sensitive to light's wavelength variations.

To eliminate the costly process of collimation, alignment, and refocusing, an all fiber polarization controller was devised by Lefevre, as described in U.S. Pat. No. 4,389,090 (H. C. Lefevre, "Single-mode Fiber Fractional Wave Devices and Polarization Controllers," Eletronics Letters, Vol. 16, No. 20, pp. 778–780, 1980). In this device, the half wave and quarter wave plates were actually made of optic fiber coils. Coiling the fiber induces stress on the fiber and therefore produce birefringence in the fiber coil via the photoelastic effect. The amount of birefringence is inversely proportional to the radius squared of the coil. By adjusting the radius of the coil and number of turns in the coil, any desired fiber wave plate can be created. Because the wave plates are made of fiber, it is not necessary to bring the light out of fiber and therefore eliminate the time consuming process of collimation, alignment, and refocusing. In addition, because fiber wave plates are much less expensive than the bulk wave plates, the material cost is also greatly reduced.

However, such an all fiber polarization controller is far from perfect. First, it is bulky. Current commercial polarization controllers of this kind have a height of 10 cm and a length of 30 cm. It is therefore difficult to use such devices in situations where size is of importance, such as in commercial optical receivers and transmitters. Second, because the fiber's diameter and material properties vary from batch to batch and from vendor to vendor, the birefringence of the fiber coils varies from fiber to fiber and has to be adjusted accordingly. However, such an precise adjustment is difficult to accomplish in this device because the radius of the fiber coils is difficult to change once created. Finally, the device is wavelength sensitive, again due to the difficulty of changing the radius of the fiber coil.

Polarization controllers using exclusively fiber squeezer were also devised by many authors, as disclosed in U.S. Pat. No. 5,004,312 to H. Shimizu and No. 4,988,169 to N. Walker, and in many journal publications (M. Johnson, "In-line fiber-optic polarization transformer," Applied Optics, Vol. 18, No. 9, pp1288–1289, 1979; R. Noe, "Endless polarization control in coherent optical communications," Electronics Letters, Vol. 22, No 15, pp 772–773, 1986; H. Shimizu, S. Yamazaki, T. Ono, and K. Emura, "Highly practical fiber squeezer polarization controller," Journal of Lightwave Technology, Vol. 9, No 10, pp 1217–1224, 1991; R. Noe, H. Heidrich, and D. Hoffmann, "Endless Polarization Control Systems for Coherent Optics," Journal of Lightwave Technology, Vol. 6, No 7, pp 1199–1207, 1988). However, because at least three fiber squeezers are needed to set the polarization to the desired state (M. Johnson, "In-line fiber-optic polarization transformer," Applied Optics, Vol. 18, No. 9, pp1288–1289, 1979; P. Granestrand and L. Thylen, "Active stabilization of polarization on a single-mode fiber," Electronics Letters, Vol. 20, No 9, pp 365–366, 1984), the device is complex, difficult to set up, difficult to adjust, and sensitive to disturbances.

Polarization controller using electro-optic effect in waveguides were also proposed, as described in U.S. Pat. No. 4,898,441 to H. Shimizu, No. 4,966,431, No. 5,212,743 to F. Heismann, No. 5,285,507 to Van der Tol, and a journal article by R. C. Alferness ("Electrooptic Guided Wave Device for General Polarization Transformations," IEEE Journal of Quantum Electronics, Vol. QE-17, No. 6, pp.965–969, 1981). However, such devices are high loss and extremely expensive.

Yet there is another problem to be solved in single mode fiber optic systems. Because many polarization sensitive devices are pigtailed with polarization maintaining (PM) fibers, a device for connecting PM fibers is of great importance. A PM fiber is a strong birefringence fiber with predetermined slow and fast axes (J. Noda, K. Kamoto, and Y. Sasaki, "Polarization Maintaining Fibers and their Applications," Journal of Lightwave Technology, Vol. LT-4, No. 8, pp.1071–1089, 1986). If the polarization of input light is linear and aligned with one of the axes, it would remain unchanged after propagating in the fiber. However, if the input polarization is not linear or is linear but not aligned with the axis, the polarization would go through periodical changes along the fiber and the output from the fiber would be elliptically polarized, with the ellipticity and orientation determined by the fiber length (M. Monerie, "Polarization-Maintaining Single-Mode Fiber Cables: Influence of Joints," Applied Optics, Vol. 20, No. 14, pp.2400–2406, 1981).

Connecting two PM fiber involves precise alignment of fiber axes while maintaining low connection loss. Fusion splicers exist for splicing the PM fibers. However, They are very expensive and not practical for field installations. Connectors have been introduced previously for connecting PM fibers. In such connectors, fibers have to be precisely aligned with an orientation key of the connector. Consequently, assembly of such PM connectors requires large capital investment and is time consuming. In addition, connectors from different manufacturers may have different orientation key positions, making it difficult to connect fibers connectorized by different venders. Finally, because all connectorizations have to be done by the connector manufacturer, devices have to be sent back and forth between the device manufacturers and the connector manufacturers, resulting in long delay time and increased damage rate.

OBJECTS AND ADVANTAGES

Accordingly, it is an object of this invention to provide a fiber optic polarization controlling apparatus which is compact, wavelength insensitive, low insertion loss, low back reflection, economical, and easy to manufacture.

Another object of the invention is to provide an apparatus for connecting two polarization sensitive devices, such as two polarization maintaining fibers, which is robust to environmental disturbances (such as vibrations and temperature changes), low loss, low back reflection, inexpensive, easy to use, and easy to manufacture.

Yet another object of this invention is to provide an apparatus for controlling the attenuation of light, often referred to as a variable attenuator, for polarization sensitive fiber optic systems, which is low insertion loss, low back reflection, inexpensive, easy to use, and easy to manufacture.

Further objects and advantages of this invention will become apparent from a consideration of the ensuing description and drawings.

BRIEF DESCRIPTION OF THE DRAWINGS

In the drawings, closely related figures have the same number but different alphabetic suffixes.

Figure 1:
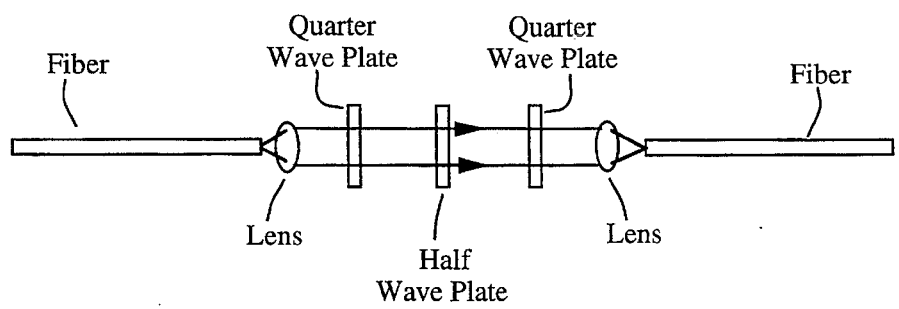
FIG. 1 is a perspective view of a prior art fiber optic polarization controller made of bulk wave plates.

| Reference Numerals in Drawings | | | |
|---|---|---|---|
| 10 | Fiber strand | 10C | Center portion of fiber strand 10 |
| 10A | Left end portion of fiber strand 10 | 10B | Right end portion of fiber strand 10 |
| 10L | Left segment of fiber strand 10 | 10R | Right segment of fiber strand 10 |
| 12 | Rotatable fiber squeezer | 12A | Top pressure block |
| 12B | Bottom pressure block | 12C | Cover of the rotatable fiber squeezer |
| 12D | Pressure regulating spring | 12E | Pressure applying screw |
| 12F | Left jointing block | 12G | Right jointing block |
| 12H | Plunging head 12H | 12I | Hollow screw |
| 12J | Applied voltage | 12K | Piezo-electric actuator |
| 13A | Applied pressure | 13B | Slow axis of squeezed fiber |
| 13C | Fast axis of squeezed fiber | | |
| 14L | Left fiber holding point | 14R | Right fiber holding point |
| 18L | Left fiber holding cap | 18R | Right fiber holding cap |

| Reference Numerals in Drawings | | | |
|---|---|---|---|
| 20 | Polarization analyzer | 21 | Polarizer |
| 23 | Optical power meter | 25 | Input light |
| 22L | Left protection cover | 22R | Right protection cover |
| 24L | Left connector receptacle | 24R | Right connector receptacle |
| 26L | Left internal fiber connector | 26R | Right internal fiber connector |
| 30L | Left external fiber connector | 30R | Right external fiber connector |
| 32 | Input PM fiber | 34 | Fiber pigtail on device 38 |
| 36 | Light signal source | 38 | Polarization sensitive device |
| 40 | Polarizing fiber | | |

DESCRIPTION AND OPERATION OF THE PREFERRED EMBODIMENTS

Figure 2:
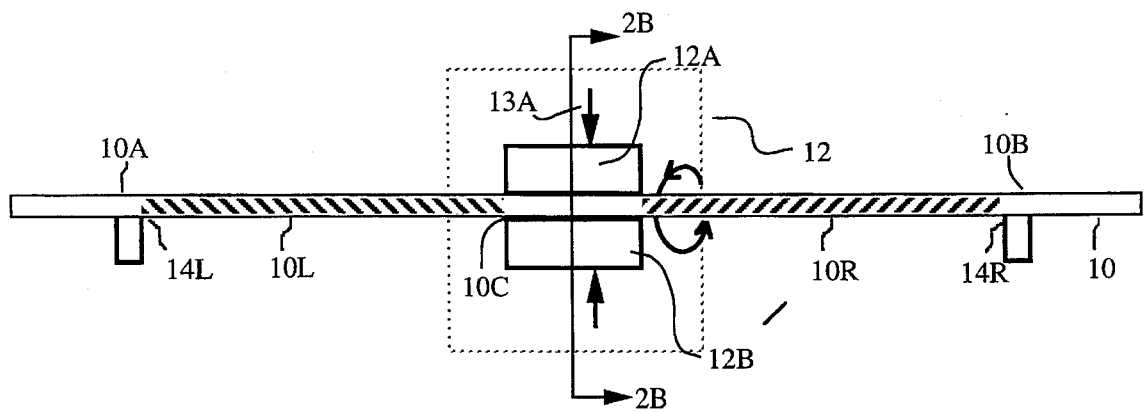
FIG. 2 shows a first embodiment of the invention for transforming an arbitrary polarization state to a desired polarization state.
Figure 2A:
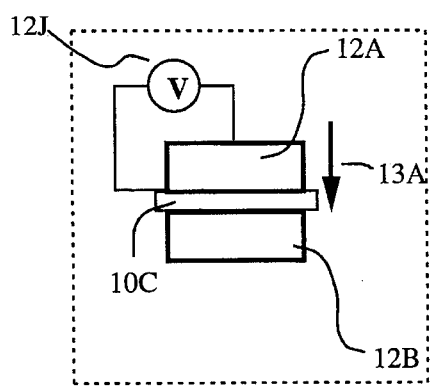
FIG. 2A shows a block of piezo-electric material adapted to be used as a fiber squeezer.
Figure 2B:
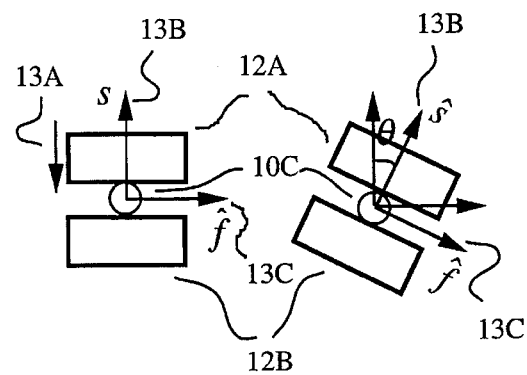
FIG. 2B shows two axial cross section views of the first embodiment, with each view corresponding to a different direction of the applied pressure.

A first embodiment of the present invention is illustrated in FIG. 2. The device consists of a strand of single mode fiber 10, a rotatable fiber squeezer 12, and a center portion 10C of fiber strand 10 sandwiched between a first squeezing block 12A and a second squeezing block 12B of the fiber squeezer 12. One or both of the blocks could be made of a piezo-electric material so that when a voltage 12J is applied to one block 12A, it would expand toward the fiber and apply a pressure 13A to fiber center portion 10C, as shown in FIG. 2B. A left end portion 10A of fiber strand 10 is affixed at a left point 14L and a right end portion 10B of fiber strand 10 is affixed at a right point 14R. The distance between left point 14L and right point 14R is about 10 to 15 centimeters, which is also the approximate length of the device of this invention. The length of fiber between left point 14L and right point 14R should be kept straight and tight.

Applying a uniform pressure 13A in a direction perpendicular to the longitudinal axis of fiber strand 10 on fiber center portion 10C will produce a linear birefringence in this portion of fiber. According to previous studies (A. M. Smith, "Single-mode fiber pressure sensitivity," Electronics Letters, Vol. 16, No 20, pp 773–774, 1980; J. Sakai and T. Kimura, "Birefringence and Polarization Characteristics of Single-Mode Opical Fibers under Elastic Deformations," IEEE Journal of Quantum Electronics, Vol. QE-17, No. 6, pp1041–1051, 1981), the amount of birefringence δ per unit length is proportional to the applied pressure and is given by the equation:

$$\delta \sim 6 \times 10^{-5} \frac{F}{\lambda d} \text{ rad m}^{-1} \quad (1)$$

where F is the applied force in Newton, d is the fiber diameter in meter, and λ is the wavelength of light in μm.

With applied pressure 13A, fiber center portion 10C acts as a birefringent wave plate with its slow axis 13B in the direction of applied pressure 13A, as shown in FIG. 2B. The retardation between slow axis 13B and a fast axes 13C (the axis which is perpendicular to slow axis 13B and the longitudinal axis of the fiber strand) can be varied between 0 and 2π by changing the applied pressure.

As shown in FIG. 2, when rotatable fiber squeezer 12 is rotated while the pressure is applied, fiber center portion 10C is also rotated so as to alter the incident polarization angle of light with respect to slow axis 13B of fiber center portion 10C. On the other hand, the rotation will also cause a segment 10L of fiber 10 at left side of fiber squeezer 12 and another segment 10R of fiber 10 at right side of fiber squeezer 12 to twist in the opposite senses. This twist induced optical activity will rotate the incident polarization by an angle of θ'=ηθ in the direction of twist, where θ is the physical rotation angle shown in FIG. 2B and η is a coefficient of twist induced optical activity. For single mode fiber, η is on the order of 0.08 (R. Ulrich and A. Simon, "Polarization optics of twisted single-mode fibers," Applied Optics, Vol. 18, No. 13, pp2241–2251, 1979; A. Smith, "Birefringence induced by bends and twists in single-mode optical fiber," Applied Optics, Vol. 19, No. 15, pp2060–2611, 1980: M. Monerie and L. Jeunhomme, "Polarization mode coupling in long single-mode fibers," Optical and Quantum Electronics, Vol. 12, pp449–461, 1980). Consequently, for a physical rotation of θ degrees, the net change of the incident angle between slow axis 13B of fiber center portion 10C and the input polarization is (1−η)θ degrees.

Alternatively, one may rotate the fiber squeezer without causing left segment 10L and right segment 10R to twist by first releasing the pressure on the pressure blocks 12A and 12B, then rotating the squeezer, and finally applying pressure to the pressure blocks 12A and 12B again. In this way, for a physical rotation of θ degrees, the net change of the incident angle between slow axis 13B of fiber center portion 10C and the input polarization is also θ degrees.

By applying pressure to fiber center portion 10C, the rotatable fiber squeezer has caused fiber center portion 10C to act as a wave plate of variable retardation and rotatable birefringent axes, or as a Babinet-Soleil compensator (M. Born and E. Wolf, Principles of Optics, New York: Pergamon Press, Sixth edition, 1980, pp. 693–694). If one chooses slow axis 13B and fast axis 13C of squeezed fiber center portion 10C as a coordinate system, as shown in FIG. 2B, the Jones matrix describing the birefringence of squeezed fiber center portion 10C can be written as:

$$\begin{bmatrix} e^{-i\frac{\Gamma}{2}} & 0 \\ 0 & e^{i\frac{\Gamma}{2}} \end{bmatrix}, \quad (2)$$

where $\Gamma \equiv 2\pi\Delta n l/\lambda = \delta l$ is the phase retardation of squeezed fiber center portion 10C. In this expression, l is the length of the squeezed fiber center portion and Δn is the index difference between slow axis 13B and fast axis 13C. In the same coordinate system, the Jones vector of the arbitrary input polarization is:

$$\vec{E}_{in} = \begin{bmatrix} E_s \\ E_f e^{i\phi} \end{bmatrix} = E \begin{bmatrix} \cos\alpha \\ \sin\alpha e^{i\phi} \end{bmatrix}. \quad (3)$$

where $E_s$ is the amplitude of the light field projected on the slow axis, $E_f$ is the amplitude projected on the fast axis, φ is phase retardation between these two components, $E \equiv \sqrt{E_f^2 + E_s^2}$, and $\alpha \equiv \tan^{-1}(E_f/E_s)$.

After squeezed fiber center portion 10C, the output light field can be written as:

$$E_{out} = E \begin{bmatrix} e^{-i\frac{\Gamma}{2}} & 0 \\ 0 & e^{i\frac{\Gamma}{2}} \end{bmatrix} \begin{bmatrix} \cos\alpha \\ \sin\alpha e^{i\phi} \end{bmatrix} = Ee^{-i\Gamma/2}\cos\alpha \begin{bmatrix} 1 \\ \chi \end{bmatrix}, \quad (4)$$

where $x=\tan\alpha e^{i(\phi+\Gamma)}$. Because $\alpha$ can be varied from 0 to $\pi/2$ by rotating fiber squeezer 12 and $\Gamma$ can be changed from 0 to $2\pi$ by changing the pressure on fiber center portion 10C, x can take any value on the complex plane Re(x) vs. Im(x). Because each point of the complex plane is associated with a polarization state (A. Yariv and P. Yeh, *Optical Waves in Crystals,* New York: John Wiley & Sons, 1984, pp. 61–62), rotatable fiber squeezer 12 is capable of generating any output polarization from an arbitrary input polarization.

Figure 3:
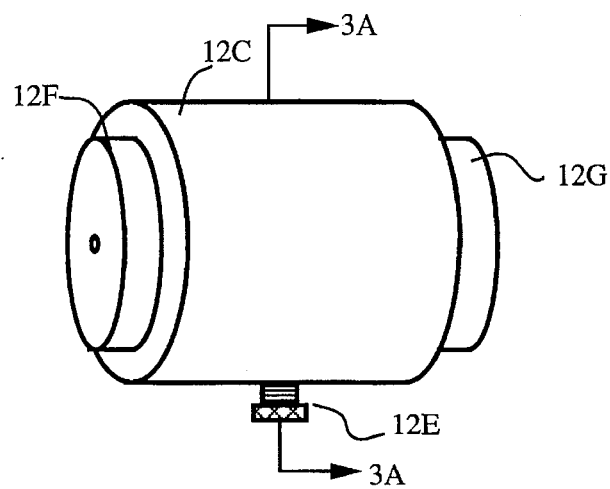
FIG. 3 shows another possible construction of a fiber squeezer.
Figure 3A:
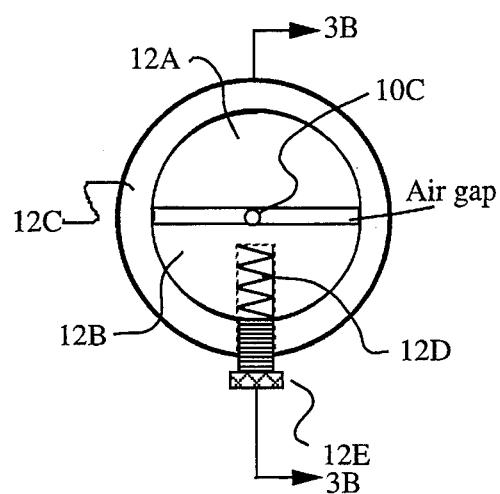
FIG. 3A is an axial cross section view of the fiber squeezer embodiment shown in FIG. 3.
Figure 3B:
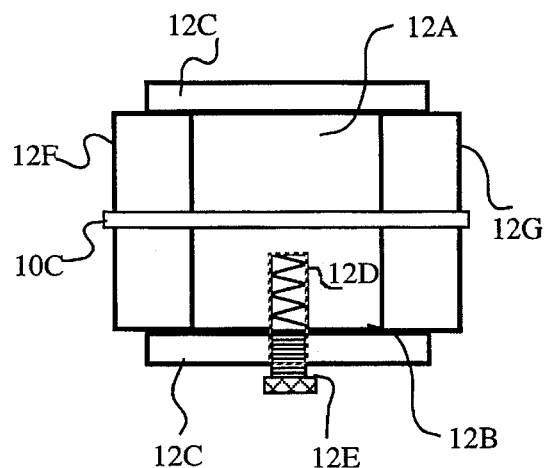
FIG. 3B is longitudinal cross section view of the fiber squeezer shown in FIG. 3.

FIG. 3 shows a second construction of the fiber squeezer 12. As shown in FIG. 3A and in FIG. 3B, the squeezer comprises of a first squeezing block 12A and a second squeezing block 12B, a pressure regulating spring 12D, a pressure applying screw 12E, a center cover 12C, a left joining block 12F and a right joining block 12G. Spring 12D is loaded in a hole in second squeezing block 12B. Left jointing block 12F and right joining block 12G are attached to the two ends of fiber squeezer 12 for connecting the squeezer with other parts. The center portion 10C of fiber strand 10 is sandwiched between first squeezing block 12A and second squeezing block 12B so that pressure can be applied to it. The length of 10C is about 1~2 cm. The amount of pressure is controlled by pressure applying screw 12E and is regulated by pressure regulating spring 12D. Let $\Delta X$ be the depression of the spring from its equilibrium position, the force imposed on fiber center portion 10C would be $\Delta X$ times a spring constant. The spring constant varies for different springs. This spring regulated pressure applying technique is significant because it provides a precise birefringence adjustment capability.

Figure 3C:
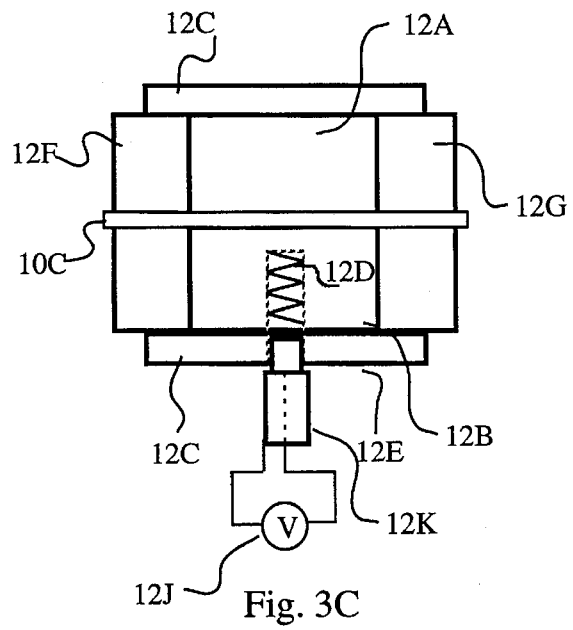
FIG. 3C shows using a piezo-electric actuator to activate the fiber squeezer.
Figure 3D:
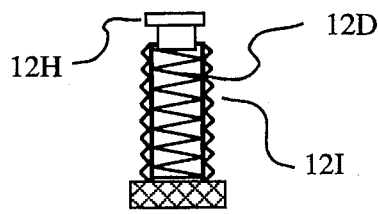
FIG. 3D shows a spring loaded plunger as a possible combination of screw and spring for applying and regulating the squeezing action.

Alternatively, one may also use a spring loaded plunger to replace the combination of the screw and the spring, as shown in FIG. 3D. The spring plunger comprises a hollow screw 12I, a spring 12D, and a plunging head 12H. Spring 12D is inserted in the void of hollow screw 12I and plunging head 12H is placed above the spring. Translating screw 12I upward will compress spring 12D and impose a force to plunging head 12H and in turn to squeezing block 12B. Another option is to use a piezo-electric actuator 12K to replace screw 12E, as shown in FIG. 3C. In this case, actuator 12K will compress the spring upon an applied voltage 12J. This compression will apply a pressure to fiber center portion 10C.

Figure 4:
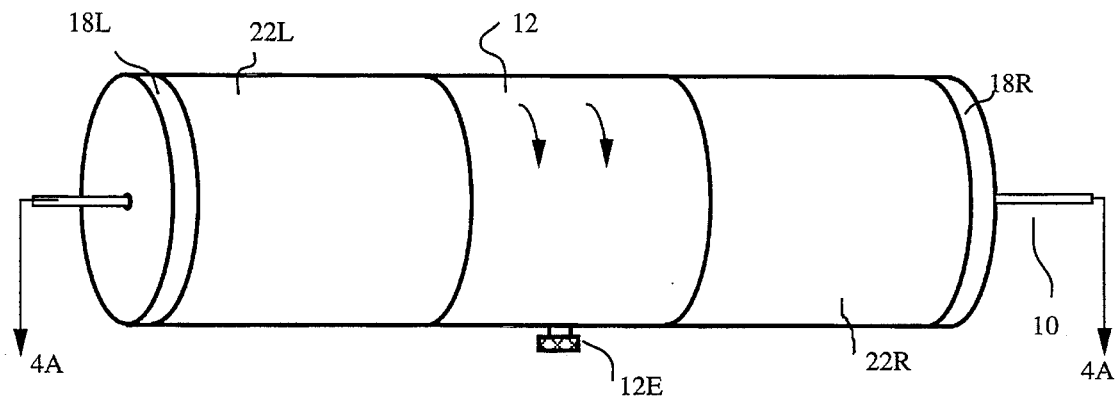
FIG. 4 is a three dimensional view of a second embodiment of the invention for transforming an arbitrary polarization state to a desired polarization state, incorporating the fiber squeezer of FIG. 3.

FIG. 4 is a three dimensional view of a second embodiment of the present invention, incorporating the fiber squeezer of FIG. 3.

Figure 4A:
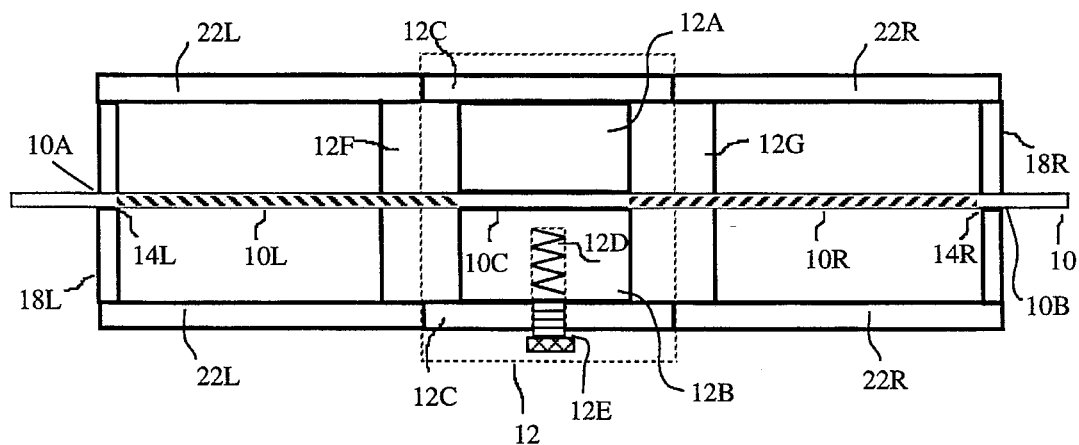
FIG. 4A is a longitudinal cross section view of the second embodiment, showing the detail of the construction.

FIG. 4A shows a longitudinal cross section view of the second embodiment, showing the details of the embodiment. This embodiment comprises of single mode fiber strand 10, rotatable fiber squeezer 12, a left fiber holding cap 18L and a right fiber holding cap 18R, as well as a left fiber protection cover 22L and a right fiber protection cover 22R. Left end portion 10A of fiber strand 10 is affixed at a left point 14L to left fiber holding cap 18L and right end portion 10B of fiber strand 10 is affixed at a right point 14R to right fiber holding cap 18R. Left cap 18L is in turn affixed to the left end of left fiber protection cover 22L and right cap 18R is affixed to the right end of fiber protection cover 22R. The fiber between left point 14L and right point 14R should be kept straight and tight. Finally, left joining block 12F of rotatable fiber squeezer 12 is connected by pressure or other means to left fiber protection cover 22L and right joining block of rotatable fiber squeezer 12 is connected by similar means to right fiber protection cover 22R. This arrangement allows fiber squeezer 12 to rotate freely around the longitudinal axis of fiber 10 while the rest of the device is kept stationary.

Figure 5:
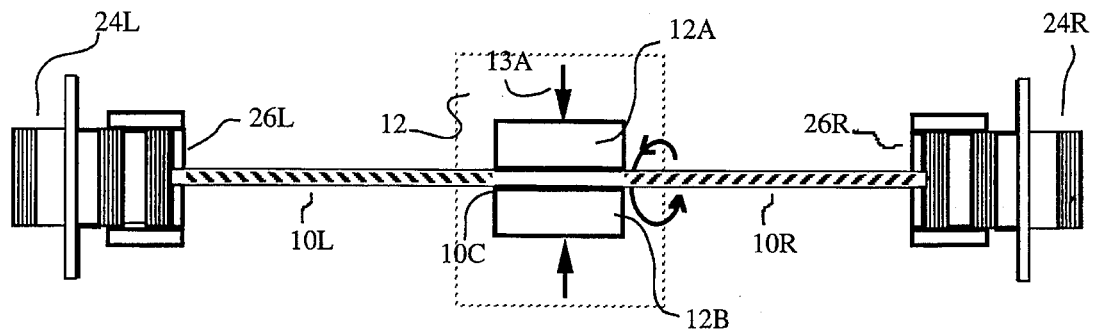
FIG. 5 is a third embodiment of the invention, especially suitable as an adapter for connecting PM fibers.

A third embodiment of the present invention is illustrated in FIG. 5. In this embodiment the left end of fiber strand 10 is connectorized with a fiber connector 26L and the right end of fiber strand 10 is connectorized with another fiber connector 26R. The connectors may be any of the commercially available types, including FC/PC, ST, D4, or angle polished versions of the above. Left connector 26L is then fastened onto a left connector receptacle 24L and right connector 26R is fastened onto a right connector receptacle 24R.

Figure 6:
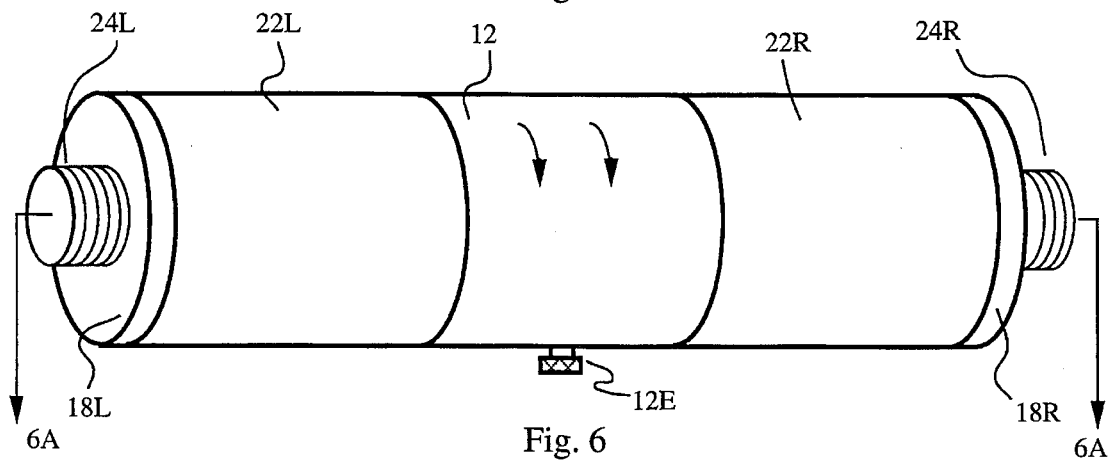
FIG. 6 is a three dimensional view of a fourth embodiment with fiber ends connectorized, especially suitable as an adapter for connecting PM fibers.

FIG. 6 is a three dimensional view of a fourth embodiment, showing a possible shape of the embodiment.

Figure 6A:
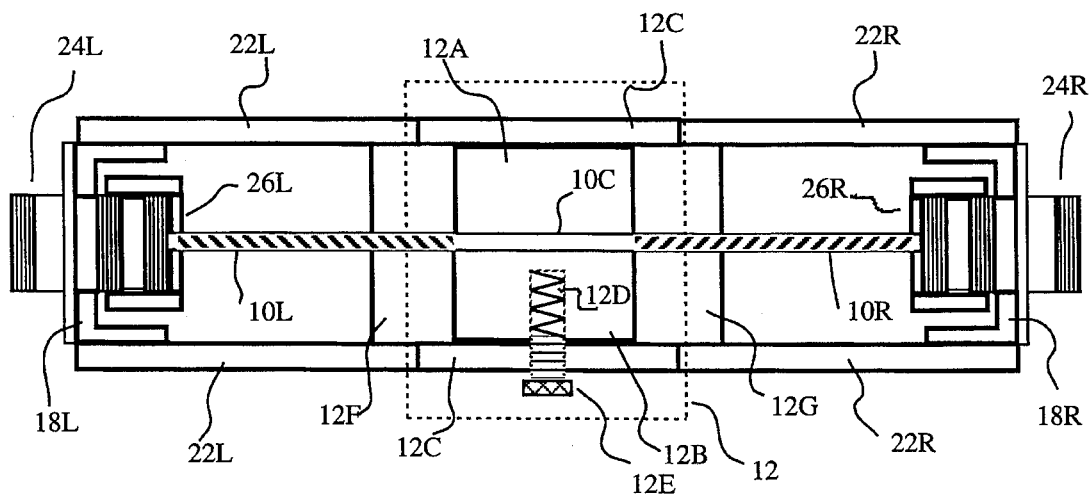
FIG. 6A is a longitudinal cross section view of the fourth embodiment of the invention.

The longitudinal cross section of the fourth embodiment is illustrated in FIG. 6A. An important difference between this embodiment and the second embodiment is that in this embodiment both ends of fiber strand 10 are connectorized with fiber connectors 26L and 26R. In addition, left connector receptacle 24L is mounted onto left fiber holding cap 18L and right connector receptacle 24R is mounted onto right fiber holding cap 18R. Left connector 26L is fastened onto left connector receptacle 24L and right connector 26R is fastened onto right connector receptacle 24R so as to fix the two ends of fiber strand 10. In addition, left connector 26L, right connector 26R, left receptacles 24L, and right receptacle 24R have other two important functions: providing a convenient means to interface with external devices and isolating the device from external disturbances.

Figure 7:
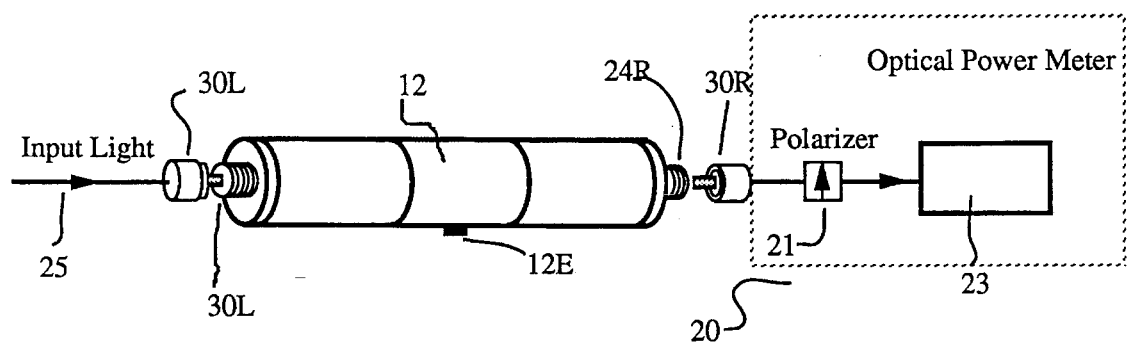
FIG. 7 illustrates a setup to adjust the apparatus of the invention for controlling the polarization state of light passing through the apparatus.

To use the apparatus of this invention as a polarization controller, one may follow the following iterative procedure. First, place a polarization analyzer 20 at the output of the apparatus, as shown in FIG. 7. For example, if the desired polarization is linear, then the analyzer should consist of a polarizer 21 aligned with this polarization and an optical power meter 23 following the polarizer. Second, connect input light 25 to the input of the apparatus and adjust the pressure of fiber squeezer 12 such that power meter 23 reading is maximized. Third, rotate fiber squeezer 12 gradually until a new local maximum is reached. Fourth, repeat the second and third steps iteratively to reach the maximum output in the power meter. Note that this iterative procedure converges fairly rapidly and a desired polarization can be achieved after 4 to 5 iterations.

A particularly important application of the apparatus of this invention is when fiber squeezer 12 is adjusted to apply a reasonable pressure to fiber center portion 10C such that fiber center portion 10C acts as a half wave plate. By rotating fiber squeezer 12, the polarization direction of an linearly polarized light can be rotated.

Figure 8:
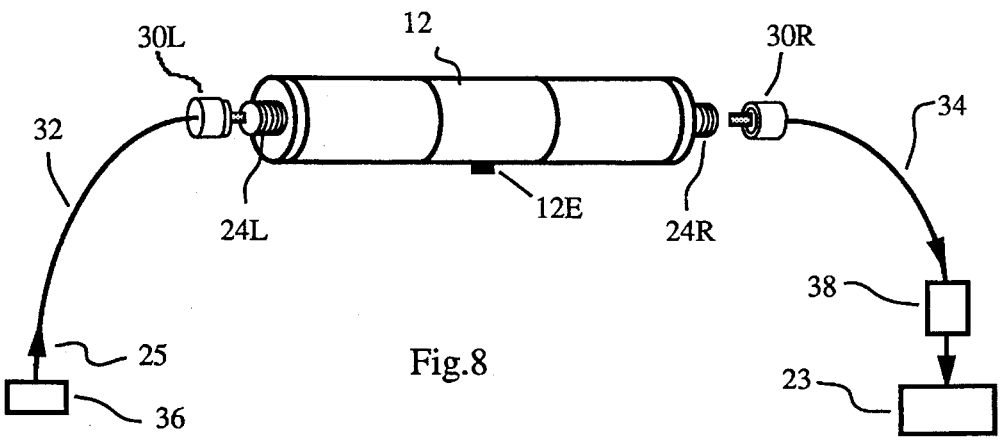
FIG. 8 illustrates using the fourth embodiment as an adapter for connecting two PM fibers.

In addition to being used as a polarization controller, the apparatus of this invention may also be used as an adapter for connecting two polarization sensitive devices that are pigtailed with PM fibers, as shown in FIG. 8. In FIG. 8, the light source 36 and the polarization sensitive device 38 are pigtailed with PM fibers 32 and 34 respectively. The other ends of PM fibers 32 and 34 are connectorized with standard connectors 30L and 30R, and are fastened onto the connector receptacles 24L and 24R. When fiber squeezer 12 is adjusted to apply a pressure to fiber center portion 10C such that fiber center portion 10C acts as a half wave plate, the linear polarization of light 25 from an input PM fiber can be rotated merely by rotating fiber squeezer 12. Because most polarization sensitive devices, such as electro-optical modulators and switches, are packaged with a polarizer at the input to define the correct polarization state, a maximum power reading of a power monitor 23 at the output of device 38 is sufficient to ensure that the polarization is properly aligned with the proper axis of the PM fiber pigtail. Note that connectors 30L and 30R on PM fibers 32 and 34 are of standard types for standard fibers. They are inexpensive and easy to install.

Figure 9A:
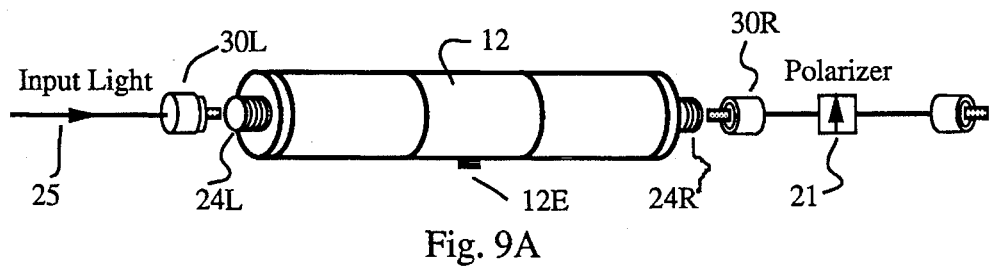
FIG. 9A illustrates connecting a polarizer to the output of the fourth embodiment to make it function as an attenuator for controlling the intensity of light in a fiber optic system.
Figure 9B:
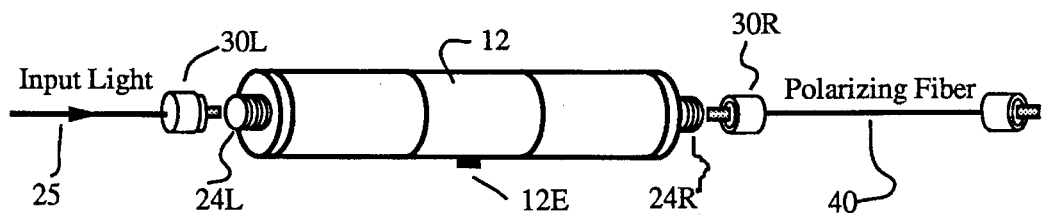
FIG. 9B illustrates connecting a polarizing fiber to the output of the fourth embodiment to make it function as an attenuator for controlling the intensity of light in a fiber optic system.

The apparatus described above can immediately be modified to act as a variable light attenuator, when it is connected with an device having polarization dependent loss or containing an input polarizer. To make the invention as a stand alone attenuator, a polarizer 21 should be connected to the output of the apparatus, as shown in FIG. 9A. An attenuation may also be achieved by replacing fiber 34 with a length of polarizing fiber 40, as shown in FIG. 9B (A polarizing fiber only supports one linear polarization while strongly attenuates the orthogonal polarization). The output power can be conveniently adjusted by rotating fiber squeezer 12 and is a sinusoidal function of the rotation angle.

From the descriptions above, a number of advantages of this invention become evident:

(a) The invention provides a convenient way to control the polarization state in a single mode fiber.

(b) The invention provides a convenient way for connecting two polarization sensitive devices, such as PM fibers.

(c) The invention provides a convenient way for controlling the intensity of light in a polarization sensitive fiber optic system.

(d) The apparatus of the invention is compact. It has a length of 10 to 15 centimeters and a diameter of 1 to 2 centimeters. Such a compact size make it convenient to use this device in commercial products, as well as in a laboratory environment.

(e) The apparatus of the invention has very low insertion loss. Because light is contained in the fiber throughout, there is almost no loss when the light passes through the apparatus. Most losses will be from fiber splices or connectors when connecting the apparatus to other fibers.

(f) The apparatus of the invention has very low back reflection. This is again because light is contained in the fiber throughout the device. The only source of back reflection is at the interfaces when connecting the device to other fibers. However, if we use angle polished connectors in FIG. 6 or a fusion splice in FIG. 4 to connect the device to other fibers, the back reflection would be minimized.

(g) The apparatus of the invention is wavelength insensitive. Because the induced birefringence of the fiber wave plate can easily be adjusted by adjusting the applied pressure, a proper wave plate for any wavelength can be achieved.

(h) The apparatus of the invention is insensitive to variations in diameter and other material properties of the fiber used, because adjusting the birefringence of the fiber wave plate is simple.

(i) The apparatus of the invention is inexpensive and easy to manufacture. The materials needed to manufacture the device are very inexpensive. The manufacturing procedure is also simple and inexpensive.

SUMMARY, RAMIFICATION AND SCOPE

Accordingly, the reader will see that the apparatus of this invention can be used to generate any desired polarization from any input polarization, can be used to connect two polarization sensitive devices, and can be used as a variable attenuator to control the optical power in a polarization sensitive system. The apparatus of the invention has very low insertion loss and very low back reflection. It is compact, easy to use, and easy and inexpensive to manufacture. It is also insensitive to wavelength variations of the light source and insensitive to variations in the fiber used.

Although the description above contains many specificaties, these should not be construed as limiting the scope of the invention but as merely providing illustrations of some of the presently preferred embodiments of this invention. For example, the device can have other shapes, such as rectangular, triangular, oval, etc.; the pressure on the fiber can be applied by piezo-electric actuators; the pressure on the fiber can be controlled and regulated by other elastic materials, etc.

Thus, the scope of the invention should be determined by the appended claims and their legal equivalents, rather than by the examples given.

What is claimed is:

1. A fiber optic apparatus for transforming a light signal passing through said fiber optic apparatus from a first polarization state to a second polarization state, comprising: a fiber squeezer comprising of a pair of opposed blocks of predetermined shape and size that can be pushed against each other so as to apply uniform pressure to an object between them; a strand of optical fiber having a center portion, a left end portion and a right end portion, and a longitudinal axis; said center portion being sandwiched between said pair of blocks of the fiber squeezer and being squeezed in a direction perpendicular to the longitudinal axis of the strand to stress the center portion to provide a birefringent medium and create a stress axis; the left end portion of the fiber strand being affixed in a left stationary position and the right end portion of the fiber strand being affixed in a right stationary position; said fiber squeezer being rotated about the longitudinal axis of the fiber strand to change the direction of the stress axis of said center portion, thereby causing a change in the polarization of the light passing through the strand and providing a convenient means for transforming an input polarization state to a desired polarization state.

2. The fiber-optic apparatus of claim 1 wherein said fiber squeezer for applying pressure to said fiber center portion comprises: a pair of opposed blocks, an enclosure, and a screw for applying pressure to the block pair, said fiber center portion being switched between the pair of blocks, said pair of blocks then being enclosed in said enclosure, the enclosure having a tapped hole at a predetermined position for the screw to be inserted against one of the blocks for applying pressure to the sandwiched fiber center portion.

3. The fiber-optic apparatus of claim 2 wherein the fiber squeezer further comprises an elastic material of predetermined size and elasticity; said elastic material being placed between the screw and one of the squeezing blocks above the screw for regulating the pressure on the fiber center portion.

4. The fiber-optic apparatus of claim 3 wherein the elastic material is a spring.

5. The fiber-optic apparatus of claim 1 wherein said fiber squeezer for applying pressure to said fiber center portion comprises: a pair of opposed blocks, an enclosure, and a piezo-electric actuator, said fiber center portion being switched between the pair of blocks, said pair of blocks then being enclosed in said enclosure, the enclosure having a tapped hole at a predetermined position for the piezo-electric actuator to be inserted against one of the blocks, the piezo-electric actuator expands or contracts in a direction perpendicular to the longitudinal axis of the fiber strand when a voltage is applied to the piezo-electric actuator, said expansion and contraction resulting in a pressure being applied to said fiber center portion.

6. The fiber-optic apparatus of claim 1 wherein at least one of the opposed blocks is made of a piezo-electric material which expands or contracts in a direction perpendicular to the longitudinal axis of the fiber strand when a voltage is applied to the piezo-electric material, said expansion and contraction resulting in a pressure being applied to said fiber center portion.

7. The fiber-optic apparatus of claim 1 wherein a left cover of a predetermined shape surrounding the fiber strand at the left side of the fiber squeezer is provided for protecting the left side portion of the fiber strand and is connected to the left end of the fiber squeezer; a right cover at the right side of the fiber squeezer surrounding the fiber strand is provided for protecting the right side portion of the fiber strand and is connected to the right end of the fiber squeezer.

8. The fiber-optic apparatus of claim 7 wherein a left end cap is attached to the left end of said left cover and a right end cap is attached to the right end of said right cover for affixing the two end portions of the fiber strand, holding the fiber straight, and sealing two end openings of the device.

9. The fiber-optic apparatus of claim 8 wherein a first fiber connector receptacle is attached to the left end cap and a second fiber receptacle is attached to the right end cap; the left end portion of the fiber strand is connectorized with a first predetermined fiber connector and the right end portion is connectorized with a second predetermined fiber connector; the first fiber connector is fastened onto said first fiber connector receptacle and second fiber connector is fastened onto said second fiber connector receptacle, whereby providing a convenient means for interfacing the device of claim 9 with external devices that are connectorized.

10. The fiber-optic apparatus of claim 1 wherein the pressure supplied by the fiber squeezer on the center portion of the fiber is such that the induced birefringent medium acts as a half wave plate.

11. The fiber-optic apparatus of claim 1 wherein a device having polarization dependent transmission is connected to the output of the fiber-optic apparatus, whereby the attenuation of a light signal passing through said device can be controlled by changing the polarization state of the light signal using the fiber-optic apparatus.

12. A method of transforming an arbitrary polarization state of an input light to a desired polarization state, comprising the steps of:

selecting a strand of optical fiber of a predetermined length;

affixing a left end portion of the strand in a stationary position at a first point;

affixing a right end portion of the strand at a second stationary position at a second point;

applying a pressure to a center portion of the strand, said pressure having a component perpendicular to a longitudinal axis of the strand to produce a birefringent medium in said strand via photoelastic effect;

changing the direction of the applied pressure in a plane perpendicular to the longitudinal axis of the fiber strand;

adjusting magnitude and orientation of the applied pressure on said center portion iteratively to simulate a wave plate with a birefringence and an orientation such that the polarization state of the input light is transformed into the desired polarization state for output.

13. A method as recited in claim 12, wherein the applied pressure on said center portion is such that the induced birefringent medium simulates a half wave plate for rotating a linear polarization state of the input light in a plane perpendicular to the longitudinal axis of the fiber strand.

14. A method as recited in claim 12, wherein the step of changing the direction of the applied pressure comprises:

keeping the pressure on the fiber center portion while rotating the fiber center portion to cause opposite twists in opposite sides of the stressed fiber center portion.

15. A method as recited in claim 12, wherein the step of changing the direction of the applied pressure comprises:

first releasing the pressure on the fiber center portion and then applying a pressure in a different direction.

16. A method of connecting a first polarization maintaining fiber and a second polarization maintaining fiber, each of said polarization maintaining fibers has a predetermined birefringent axis perpendicular to a longitudinal axis of each of said polarization maintaining fibers, said method comprises the steps of:

selecting a strand of optical fiber of a predetermined length;

connecting a left end of the strand with an output end of the first polarization maintaining fiber;

connecting a right end of the strand with an input end of the second polarization maintaining fiber;

affixing the left end of the strand in a stationary position at a first point;

affixing the right end of the strand at a second stationary position at a second point;

applying pressure to a center portion of the strand in a direction perpendicular to a longitudinal axis of the strand to produce a birefringent medium via photoelastic effect; the applied pressure on said center portion is such that the induced birefringent medium simulates a half wave plate;

gradually changing the direction of the applied pressure in a plane perpendicular to the longitudinal axis of the fiber strand so as to rotate the polarization state of a light from the first polarization maintaining fiber until the polarization state is aligned with the birefringent axis of the second polarization maintaining fiber.

17. A method as recited in claim 16, wherein the step of changing the direction of the applied pressure comprises:

keeping the pressure on the fiber center portion while rotating the fiber center portion to cause opposite twists in opposite sides of the stressed fiber center portion.

18. A method as recited in claim 16, wherein the step of changing the direction of the applied pressure comprises:

first releasing the pressure on the fiber center portion and then applying a pressure in a different direction.

19. A method of controlling an attenuation of a light signal in a fiber optic system, comprising the steps of:

selecting a strand of optical fiber of predetermined length;

affixing a left end portion of the fiber strand in a stationary position at a first point;

affixing a right end portion of the fiber strand at a second stationary position at a second point;

connecting the right end of the fiber strand with a device having polarization dependent transmission;

applying a pressure to a center portion of the strand in a direction perpendicular to a longitudinal axis of the strand to produce a birefringent medium via photoelastic effect;

changing the direction of the applied pressure in a plane perpendicular to the longitudinal axis of the fiber strand;

controlling magnitudes and direction of the applied pressure on said center portion iteratively to simulate a wave plate with a variable birefringence and a variable orientation for changing a polarization state of the light signal passing through the fiber strand so as to change the attenuation of the light signal by the device having polarization dependent transmission.

20. A method as recited in claim 19; wherein the applied pressure on said center portion is such that the induced birefringent medium simulates a half wave plate.

21. A method as recited in claim 19, wherein the step of changing the direction of the applied pressure comprises:

keeping the pressure on the fiber center portion while rotating the fiber center portion to cause opposite twists in opposite sides of the stressed fiber center portion.

22. A method as recited in claim 19, wherein the step of changing the direction of the applied pressure comprises:

first releasing the pressure on the fiber center portion and then applying a pressure in a different direction.

\* \* \* \* \*